(12) United States Patent
Wu et al.

(10) Patent No.: US 7,742,225 B2
(45) Date of Patent: Jun. 22, 2010

(54) BANDPASS REFLECTOR WITH HEAT REMOVAL

(75) Inventors: Angus Wu, Tucson, AZ (US); Anurag Gupta, Corvallis, OR (US); P. Guy Howard, Junction City, OR (US); John M. Koegler, III, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1061 days.

(21) Appl. No.: 11/176,028

(22) Filed: Jul. 6, 2005

(65) Prior Publication Data

US 2005/0275960 A1 Dec. 15, 2005

Related U.S. Application Data

(63) Continuation-in-part of application No. 10/955,834, filed on Sep. 29, 2004, now abandoned, which is a continuation-in-part of application No. 10/867,956, filed on Jun. 14, 2004, now abandoned.

(51) Int. Cl.
*F21V 9/04* (2006.01)
(52) U.S. Cl. ..................................... 359/359
(58) Field of Classification Search ................ 359/359, 359/883
See application file for complete search history.

(56) References Cited

U.S. PATENT DOCUMENTS 3,598,482 A    8/1971  Miller
3,944,320 A    3/1976  Mclintic et al.
3,988,626 A   10/1976  Boudouris
4,138,713 A    2/1979  Szpur
4,536,832 A    8/1985  Lemons
4,780,799 A   10/1988  Groh
5,274,228 A *  12/1993  Kaplan .................. 250/227.31
5,342,681 A *   8/1994  Sulzbach ................. 428/310.5
5,458,505 A   10/1995  Prager
5,528,714 A    6/1996  Kingstone et al.
5,879,159 A    3/1999  Cipolla
5,884,991 A    3/1999  Levis et al.
5,947,590 A    9/1999  Meuse et al.
6,053,623 A    4/2000  Jones et al.
6,114,807 A    9/2000  Kavanagh
6,198,098 B1*  3/2001  Laou ....................... 250/338.1
6,212,004 B1   4/2001  Stachowiak et al.
6,219,573 B1*  4/2001  Pompei .................... 600/474
6,387,209 B1   5/2002  Nettesheim
6,561,675 B1   5/2003  Kavanagh
6,627,307 B1*  9/2003  Reichert et al. ............. 428/332
2002/0167282 A1  11/2002 Kirkpatrick et al.
2003/0090902 A1   5/2003 Kavanagh
2004/0264197 A1* 12/2004 Bewig et al. ................. 362/294

FOREIGN PATENT DOCUMENTS

DE   89 06 325 U1    11/1989
WO   WO 99/26088  *   5/1999

* cited by examiner

*Primary Examiner*—Joshua L Pritchett

(57) ABSTRACT

A reflector for a projector includes a metal reflector that defines an optical surface. An absorptive surface is disposed on the optical surface. A layer of germanium is disposed on the absorptive surface. A band-pass reflective surface is further disposed on the absorptive surface.

36 Claims, 8 Drawing Sheets

BANDPASS REFLECTOR WITH HEAT REMOVAL

This Application is a continuation-in-part of application Ser. No. 10/955,834, filed Sep. 29, 2004, now abandoned hereby incorporated by reference, which was a continuation in part of Ser. No. 10/867,956 filed Jun. 14, 2004, now abandoned.

BACKGROUND

A typical projection system includes an arc-lamp source of bright white light, a method for separating the white light into red, green and blue spectral components, and a spatial light modulator (SLM, also called a light valve) for two dimensional imaging each of the spectral components to create a color picture. The SLM performs the spatial and temporal modulation in response to an analog or digital video signal generated by a computer or another video source such as a TV tuner, VCR, HDTV broadcast, or DVD player. The SLM typically creates sequential images in red, green, and blue color planes although other color separation techniques exist such as cyan, yellow, magenta, and optionally white planes. The color planes may then be recombined optically and projected onto a screen, or they may be flashed temporally in sequence onto the screen at such a rate that a viewer perceives only a single image.

Most digital projectors compete based on the number of screen lumens that the projector places on the projection screen. Although the competition in the projector market is fierce, cost considerations as well as size constraints have limited the development of more efficient light sources.

Most conventional small projector systems have total optical system efficiency from bulb to screen between 12-20%. That is, only up to 12-20% of the light created by the bulb actually exits from the projection optics and makes it to the screen. This inefficient design results in not only a dimmer display but also the consumption of needlessly wasted power. Much of the wasted power is in the form of electromagnetic energy outside of the visible spectrum that is unwanted and should be removed to limit damage to other components in the projector. Several approaches have been attempted to increase the efficiency but with little success.

There are several problems with existing arc-lamp sources. The most commonly used lamp source is a mercury vapor arc lamp. This lamp produces the most light for a given wattage and has a small point source. However, mercury arc lamps have a short lifetime compared to other technologies and produces light that is spectrally deficient in the red spectrum while producing energy in the ultraviolet (UV) spectrum. In addition, mercury is a hazardous material that many countries would like limit the use of or ban outright. Although other bulb technologies could be substituted for the mercury vapor arc lamp, none has its efficiency and small spot size that allow for a small etendue and thus production of small high intensity projectors. Etendue is a method of measuring the system throughput. Etendue once created by a light source can only be increased. In a perfect lossless optical system, etendue is always conserved. Etendue in an optical system is limited by the element, which has the least etendue. An optical source system must have an etendue less than the limiting etendue or maximum system efficiency. Simply replacing the arc lamp bulb with a non-arc lamp will not offer a satisfactory competitive solution because of the non-point source nature of non-arc lamps limits their available etendue and they tend to produce emissions outside of visible light, which usually need to be eliminated. To allow for substituting out mercury bulbs, the light path in a projector must have increased etendue efficiency and unwanted energy removal. Therefore, there is also a need for a solution that allows other bulb technologies to compete with mercury vapor arc lamps.

In summary, there exists a need to overcome the efficiency and other problems associated with arc lamp bulbs, particularly mercury vapor types.

BRIEF DESCRIPTION OF THE DRAWINGS

The invention is better understood with reference to the following drawings. The elements of the drawings are not necessarily to scale relative to each other. Rather, emphasis has instead been placed upon clearly illustrating the invention. Furthermore, like reference numerals designate corresponding similar parts through the several views.

DETAILED DESCRIPTION

Figure 1:
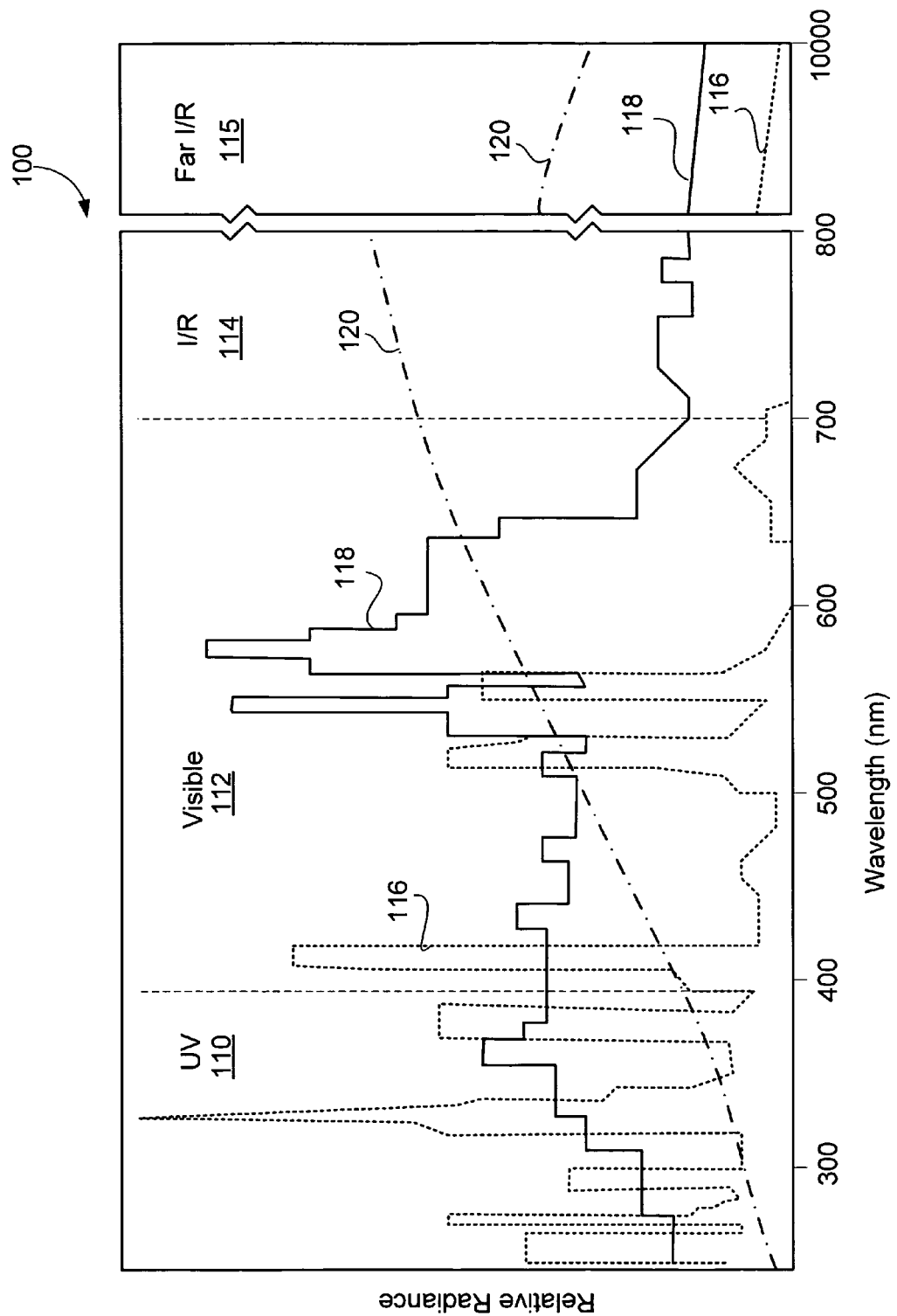
FIG. 1 is an exemplary graph of the relative spectral radiance of a mercury-arc lamp source, a Xenon lamp source, and a tungsten lamp source from the ultraviolet to near infra-red wavelengths.

The following is a detailed description of the best presently known modes of carrying out the inventions. This description is not to be taken in a limiting sense, but is made merely for illustrating the general principles of the invention. It is noted that detailed discussions of projection systems components that are not pertinent to the present invention have been omitted for the sake of simplicity. The present invention is also applicable to a wide range of display technologies and presentation systems, including those presently being developed or yet to be developed. For example, although various exemplary projection systems are described below with reference to digital micro-mirror projectors, other types of spatial light modulators (SLMs) such as magnetorehological, diffractive, transmissive, etc. are equally applicable to the present invention.

The optical devices in embodiments of the present invention are applicable to a broad range of optical devices technologies and can be fabricated from a variety of optic materials. The following description discusses several embodiments of the optical devices of the present invention as implemented in reflective embodiments, since the majority of currently available optical devices are fabricated in reflective optics and the most commonly encountered applications of the present invention will involve reflective optics. Nevertheless, portions of the present invention may also advantageously be employed in refractive, diffractive, and combinations of reflective and the aforementioned technologies. Accordingly, the present invention is not intended to be limited to those devices fabricated in reflective optics, but will include those devices fabricated, alone or in combination, in one or more of the available optic methods and technologies available to those skilled in the art including those not listed.

It should be noted that the drawings are not true to scale. Further, various parts of the optical elements have not been drawn to scale. Certain dimensions have been exaggerated in relation to other dimensions in order to provide a clearer illustration and understanding of the present invention.

In addition, although some of the embodiments illustrated herein are shown in two-dimensional views with various regions having length and width, it should be clearly understood that these regions are illustrations of only a cross-sectional portion of a device that is actually a three-dimensional structure. Accordingly, these regions will have three dimensions, including length, width, and depth, when fabricated as an actual device. Although, some three dimensional structures will be transverse rotations of the two dimensional structures shown, other three dimension structures having similar longitudinal cross-sectional portions exist, such as transverse rectangular shapes (e.g. extending the transverse cross-section linearly in depth or width dimensions), and are to be viewed as falling within the scope and spirit of the invention.

Further, although different embodiments are shown in cross-section along the longitudinal axis, different sections of the embodiment may have transverse cross-sectional profiles. The present embodiments illustrated are meant to cover the various possible transverse cross-sectional combinations possible and still remain within the scope and spirit of the invention.

Moreover, while the present invention is illustrated by embodiments directed to projector devices, it is not intended that these illustrations be a limitation on the scope or applicability of the present invention. It is not intended that the projector devices of the present invention be limited to the physical structures illustrated. These structures are included to demonstrate the utility and application of the present invention to presently preferred and alternative embodiments.

Embodiments of the invention can include any optical assembly that couples a light source adapted to create electromagnetic energy and a fixture for holding the light source that defines an optical cavity. A band-pass filter is deposited on the optical cavity to reflect a range of light frequencies and further absorb electromagnetic energy outside the range of light frequencies. A heat removal device integrated into the optical assembly dissipates the absorbed electromagnetic energy.

More specifically, different embodiments are directed to a band-pass reflective assembly that includes heat removal from a light source. Various light sources include but are not limited to mercury-arc bulbs, Xenon-arc bulbs, and halogen light sources. The embodiments provide for making optical coatings on a heat removal surface that reflects very efficiently in one bandwidth region (such as visible light) while absorbing wavelengths outside the bandwidth region. For instance in one embodiment, a reflector assembly for a projector includes a heat conductive assembly defining an electromagnetic (EM) chamber. A thin absorptive layer is disposed on the EM chamber to absorb ultraviolet (UV) and infra-red (IR) energy that is generated in the EM chamber by a light source. The thin absorptive layer is also used as an adhesion layer for the decoupling layer. A germanium decoupling layer is disposed on the absorptive layer. The germanium also partially performs absorption of IR energy. The germanium may be hand polished or otherwise finished to provide a smooth optical surface. A thin-film stack filter is disposed on the germanium decoupling layer to allow a first band of frequencies to reflect (preferably in the visible light spectrum) while allowing one or more bands of other frequencies such as UV and IR to pass to the decoupling and absorptive layer. The germanium decoupling layer provides for isolation of the reflection filter from the absorptive layer and allows for ease of coating the filter over the absorptive layer by providing a highly specular surface. When using germanium for the decoupling layer, this isolation and ease of coating of the filter over the absorptive layer can be incorporated into the germanium due to its optical and crystalline properties. Germanium also provides a better temperature coefficient match than does frit glass or other dielectric materials that could be used for the decoupling layer. Further, smoothing out the surface of the decoupling layer can be accomplished by several methods, such as by polishing. The heat conductive assembly transfers the heat generated by the UV and IR energy in the absorptive and decoupling layers to the ambient environment. Optionally, a fan or other heat removal device is used to further dissipate the heat away form the reflector assembly.

The layer of germanium used for the decoupling layer provide the desired proper optical, mechanical, and thermal properties necessary to be able to be a substrate for the stack of thin-film dielectric or other metal film reflective layer. The optical properties include the proper complex refractive index and optical smoothness. The mechanical properties include lattice constant match, film stress, and film adhesion properties. By having the lattice constant of germanium being a close match to the metal reflector, such as with aluminum, there is less stress at the interface of the two metals that enhances the bonding force. The thermal properties of the semiconductor germanium are much better than that of an insulator such as frit glass or most other dielectrics. By using germanium as the decoupling layer and part of the absorption function, the structure of the coating and the resulting process steps are simplified. This simplification provides an advantage on both thermal cycling and thermal conduction. To enhance the adhesion of the Ge substrate to the metal reflector, some adhesion layers may be deposited on the metal reflector. The adhesion layers can also provide additional absorption capabilities and thus be an absorption layer. This use of the adsorption layer allows for minimizing the thickness of germanium that is deposited on the metal reflector and enhances the thermal coupling of the unwanted UV and IR radiation.

In one embodiment of a reflector for a projector, a metal assembly is used to define a shaped surface for concentrating or otherwise focusing light from a light source. Metals such as aluminum, copper, gold, nickel, titanium, chromium, or alloys and compositions thereof can be used for the shaped surface. Other metals are of course possible. Such shaped surfaces include ellipsoid or parabolic surfaces although other hyperbolic, curved, concave, convex, flat, or angled surfaces can be used. A UV and IR absorptive filter layer of germanium is disposed on the shaped surface. If desired, a further absorptive and/or adhesion layer can be added between the metal assembly and the germanium layer to increase the absorption of desired frequencies and to further conduct heat to the heat conductive metal assembly. While the germanium layer functions as a decoupling layer, optionally, an additional decoupling layer is disposed on the germanium layer. The decoupling layer is sufficiently transparent to UV and IR energy and is of a sufficient thickness along with the germanium layer such that combined they are greater than the coherence length of the light source and less than twice the wavelength of the longest frequency that is to be absorbed. A reflective coating stack is disposed on the decoupling layer for reflecting visible light while allowing transmission of UV and IR. Optionally, the reflective coating stack can be designed to allow for UV absorption by using $TiO_x$ as one of the coating layers. Additionally, the coating stack can be designed to absorb IR through the proper design of the coatings.

For instance, a mercury-arc lamp may have a coherence length of about one-half a micron. A decoupling layer having a thickness of greater than 1 micron provides sufficient non-interaction of the light between the reflective layers and the absorption layers. A decoupling layer of about 5 um to about 10 um provides for sufficient decoupling of far IR radiation between the reflective stack and the absorption layer.

One method of using a heat sink as an optical reflector is to define a cavity in the heat-sink to form an optical cavity. The cavity is then deposited, coated or otherwise formed with a material absorptive to at least one range of light. The absorptive material is then coated with a decoupling layer including at least one layer of germanium and optionally polished. A stack of thin-film layers of material that is reflective to a different range of light is then deposited, coated or otherwise formed thereon the decoupling layer.

Another method of creating a filtered light source for an optical projector is to create a wide-band light source spanning from the infra-red (IR) to the ultraviolet (UV). The IR and UV light from the wide-band light source is filtered with a set of thin-film dielectric coatings to create both a white light output and a thermal radiant output. The thermal radiant output is transferred to a heat-sink via a germanium layer forming an optical device that the thin-film dielectric coatings are disposed on to allow the optical device to project a relatively "cool" white light output.

While a reflector assembly for a projector is generally described, the invention can be used with any reflector device such as an integrating rod or other mirrored surface. The reflector would include a metal reflector with an absorptive and/or adhesive coating. A germanium layer is disposed on the absorptive and/or adhesive coating. A frequency selective optical reflector is disposed on the germanium layer that allows at least one of UV and IR to pass through to the germanium layer and absorptive layer. As such, the reflector then has a metal reflector defining an optical surface with an absorptive surface disposed on the optical surface and a germanium layer disposed on the absorptive surface. The absorptive surface must absorb light outside of the visible wavelengths. It may reflect or absorb the light in the visible region. The germanium layer operates as a decoupling layer and a partially absorbing layer for IR. A layer reflective to visible light and transmissive to non-visible light is disposed on the germanium layer. The germanium layer is finished smooth enough to form an optical surface and its complex refractive index does not lead to a complicated design and implementation of a high reflectance visible band-pass coating. Generally, the metal reflector has a coefficient of thermal expansion (CTE) substantially similar or close to the CTE of the germanium layer and the CTE of the absorptive layer, thus allowing for a wide operating temperature range. The absorptive surface may be fabricated to include one or more metal-dielectric or semi-metal-dielectric coatings in the absorptive layer selected for their absorption capabilities in a particular wavelength region, such as $Ti_xO_y$.

For instance, an anti-reflective (AR) coating on the metal reflector by using a metal or semi-metal dielectric phase matching layer includes $MgF_2$ and a thin film of chromium to create a broadband black layer. Alternatively, the absorptive surface can be grown or otherwise created from metal reflector assembly such as by thermal oxidation or chemical treatment of the metal reflector surface ($AlO_x$ or $Al_xO_y$ in general). In addition, the absorptive surface can include microcrystalline materials (such as yttrium oxide, $Y_2O_3$ or $Y_xO_y$ in general). The absorptive surface may be composed of chromium black or germanium black directly deposited on an aluminum surface. Germanium black may be created by chemically etching the germanium surface.

In one embodiment, the metal reflector is aluminum and the absorptive layer is aluminum nitride. This embodiment can be made by bombarding the aluminum substrate in nitrogen to create the aluminum nitride that is a very stable black layer (also called aluminum black). This embodiment allows for depositing germanium layer directly on the absorptive layer before depositing the high reflectance coating.

The germanium layer generally includes a thickness more than 1 micron to decouple the reflective surface from the absorptive surface. This thickness is generally greater than the coherence of the light source. The germanium layer is preferably less the about 5 um to about 10 um to maximize heat transfer and to adequately decouple the light between the absorptive surface and the high reflectance coating. Generally, the germanium surface is polished to form a smooth optical surface for the reflective surface. The reflective surface may be a deposited metal film or it can be created using one or more thin film dielectric layers on the germanium layer. In some embodiments, the reflective surface may include of layers of $SiO_2$ and tantalum oxides (e.g. $Ta_2O_5$ or TaOx), titanium oxides (e.g. $TiO_2$ or $Ti_xO_y$), niobium oxides (e.g. $NbO_x$), zirconium oxides (e.g. $ZrO_x$), and hafnium oxides (e.g. $HfO_x$), or combinations thereof, just to name a few.

The metal reflector may have a set of cooling fins or a heat pipe connected to the metal reflector to allow for the heat removal. Those of skill in the art know several other heat removal options. The optical cavity can optionally be sealed to ambient air or include openings to allow for additional heat flow depending on a desired thermal and optical design.

More detailed descriptions of how to make and use specific embodiments of the invention follow but are not meant to be limiting but only exemplary of the invention, which is defined in the claims that follow this description.

FIG. 1 is an exemplary graph 100 of the relative spectral radiance of a mercury-arc lamp source 116, a Xenon lamp source 118, and a tungsten lamp source 120 from the ultraviolet (UV) 110, into the visible 112 and further to near infra-red (IR) 114 wavelengths and out to the far IR 115. UV is generally considered as electromagnetic energy having wavelengths less than 400 nanometers (nm). Visible light is generally considered to have electromagnetic energy in the bandwidth of 400 nm to 700 nm. IR electromagnetic energies generally are considered as having wavelengths greater than 700 nm. As can be seen with the mercury-arc lamp source 116, most of the energy is concentrated in the ultraviolet and visible wavelength regions. The Xenon lamp source 118 has a more uniform distribution (although with some peaks) through all four regions. A tungsten light source is generally characteristic of black body radiation and has a relative radiance that increases from the UV 110 through the visible 112 and into the IR 114 regions and tapers off in the far IR region 115. All light sources create energy outside of the visible 112 region that needs to be filtered out in conventional projection systems to prevent harm to other optical components or the users. Most systems use dichroic dielectric filters downstream of the light source that transmit the visible and reflect the UV and IR that requires multiple fans and special optics to be used. Most often the rejection of UV and IR is very inefficient ultimately leading to uncontrolled absorption by various parts of the projector. The embodiments of the invention, however, allow for incorporation of the non-desired wavelengths to be absorbed and the energy dissipated using special coatings on metal surfaces of the light source or other reflective assemblies.

Figure 2:
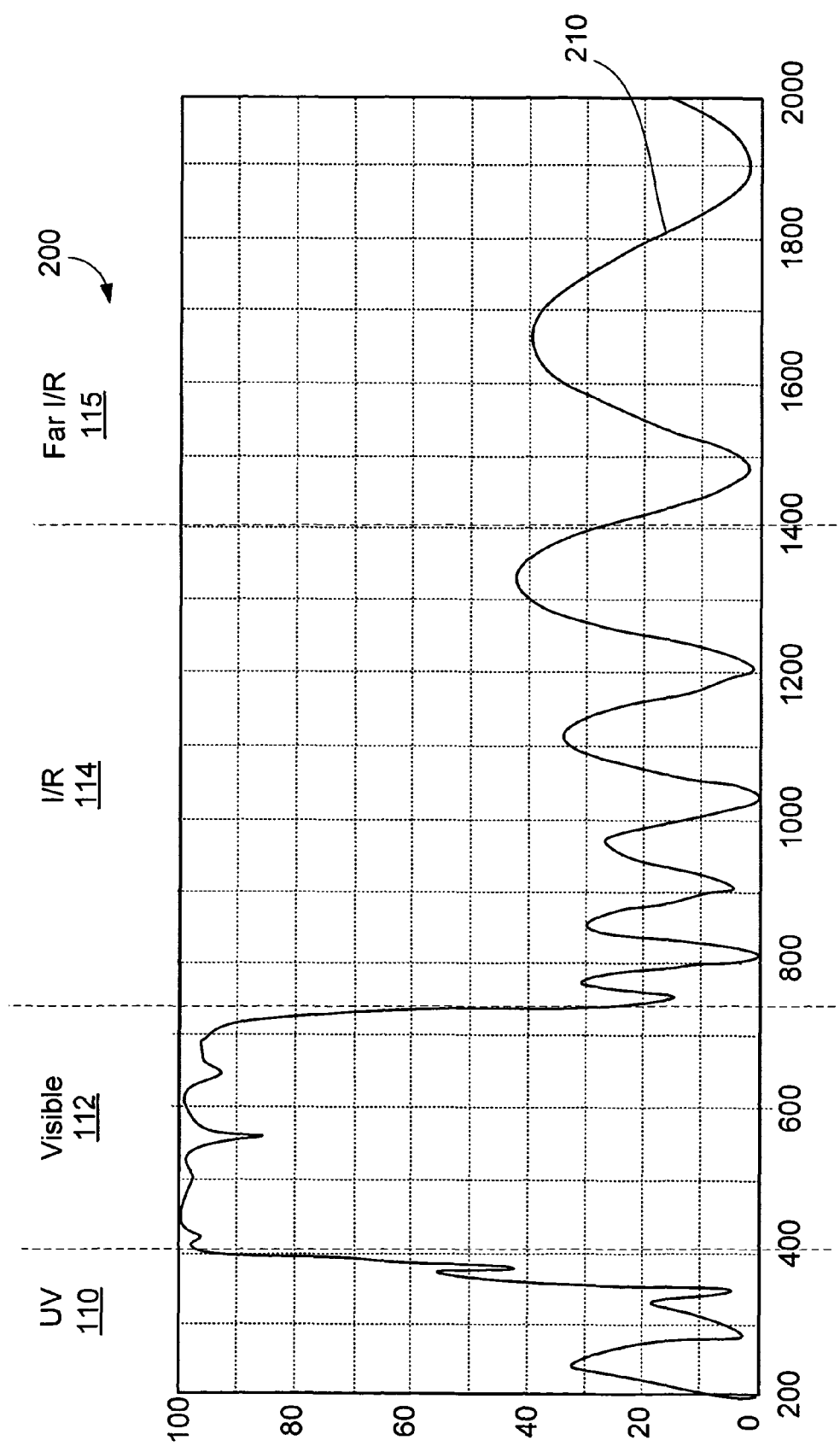
FIG. 2 is a graph of a exemplary band-pass function for a reflective surface on one embodiment of the invention.

FIG. 2 is a graph 200 of an exemplary band-pass function 210 for a reflective/absorptive surface on one embodiment of the invention. A reflective layer reflects light in the visible 112 region while allowing other energy in the UV 110 and IR 114 regions to be transmitted to the absorptive layer and converted to heat (photon to phonon conversion). This heat can then be dissipated by the integral heat removal device in the reflector, such as a heat sink or heat pipe system.

Figure 3:
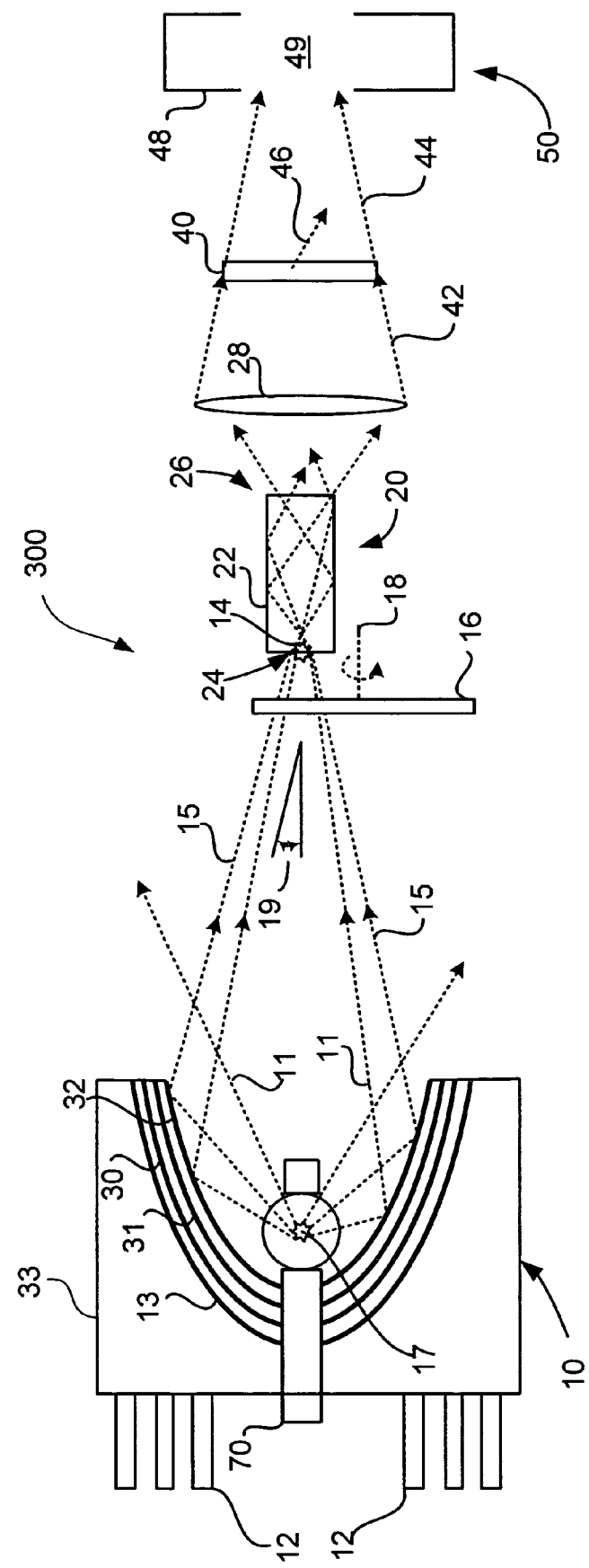
FIG. 3 is a schematic of an exemplary display system using at least one embodiment of the invention.

FIG. 3 is a schematic diagram of an unfolded optical display system 300 found in an exemplary projection device incorporating at least one aspect of the invention. The optical display system includes a light source 10, a color wheel 16, a spatial homogenizer 20, a spatial light modulator (SLM) 40, and imaging optics 50. The light source 10 includes an elliptical reflector 13 and a bulb 70. The bulb 70 is generally a mercury-vapor arc lamp that produces a small fireball 17 at a first focal point (object point) of the ellipse of broad band light that is imaged (focused) to a second focal point to create an image point 14 at the entrance 24 of the spatial homogenizer 20, shown as integrating rod 22. While the light source 10 shown is that of a mercury-bulb other light types can be used, for instance, those with skill in the art can substitute a closed-environment Xenon bulb system and still meet the spirit and scope of the invention. In general, the invention can be incorporated in many optical devices having reflective surfaces, including the spatial homogenizer 20.

The light source 10 creates both a set of focused light rays 15 that converge to the image point 14 using a reflective layer 32 and stray light rays 11 that do not converge to the image point 14. The light source 10 has electromagnetic energy in the UV and IR wavelengths that are transmitted through a visible reflection layer 32 and a decoupling layer 31 to be absorbed in an absorptive layer 30 of germanium (Ge). The light source 10 includes a metal reflector 33 that defines the elliptical reflector 13 on which the special coatings of the absorptive layer 30, the decoupling layer 31 and reflective layer 32 are applied. The metal reflector 33 includes an integral heat removal device such as heat sink 12 that removes the energy absorbed by the absorptive layer 30.

The color wheel 16 is rotated about a color wheel axis 18 to present one or more color sections (such as red-green-blue, red-green-blue-white, or red-green-blue-red-green-blue, to name a few) in order to convert the visible light spectrum (white light) from light source 10 to a temporal sequence of colors. Mercury lamps, however, are usually deficient in the amount of red spectrum produced, thus creating off-white light that must be corrected by the color wheel or other mechanism. The color wheel 16 is one of a number of gamut generators 56 (see FIG. 4) that can produce a sequence of colors. The spatial homogenizer 20 is used to create a uniform intensity in the light rays emitted from the transverse cross-sectional profile at exit 26.

The focused light at the image point 14 enters the spatial homogenizer 20 at entry 24 at a first angle 19 (usually called a cone half-angle) based on the optical design of the elliptical mirror. Typically, a conventional integrating rod 22 used as spatial homogenizer 20 has a rectangular transverse cross-section profile (as opposed to the longitudinal cross-section shown) to convert the light into a rectangular image for focusing on a correspondingly ratioed rectangular shaped SLM 40. Most integrating rods 22 are constructed as hollow rectangular boxes and coated inside with a highly reflective coating to allowing incoming light rays to reflect off the surfaces. Optionally, additional UV and IR filtering can be accomplished by coating the integrating rod with similar films as coated on the metal reflector 33 surface including a layer of germanium. This reflection spatially homogenizes the light thereby evenly distributing it over the transverse cross-sectional exit aperture to create a uniform intensity in the cross-section of light rays leaving the exit 26 of the integrating rod 22. Generally, for conventional rectangular integrating rods 22, the light exits from exit 26 at first angle 19. The light rays leaving the integrating rod are then imaged into a set of uniform light rays 42 with a condensing lens 28 or other optics to fill the area occupied by the active elements of the SLM 40. This imaging is performed by having the height and width of the integrating rod 22 matched in ratio to the dimensions of the SLM 40. The reflected light 44 leaving the SLM 40 is then optically coupled into imaging optics 50 such that the reflected light 44 is substantially captured in the imaging optics aperture 49 of projection optics 48. Deflected light 46 is directed away from the imaging optics aperture 49 so it is not projected. Although the SLM 40 is described as reflective, the optical path shown is unfolded for ease of understanding. An actual design would require the light to reflect off SLM 40 at compound angles. Alternatively, the SLM 40 can be transmissive such as with and LCD panel, which is known to those of skill in the art.

There are several methods of manufacturing metal reflector 33 embodiments: One method is to form a rough hollow shape of the ellipse in a cylinder and then single point diamond turning (SPDT) the hollow shape within the cylinder. Another approach is to create two parts that are electroformed with a seam along the optical axis. Alternatively, the two parts can be electroformed as two parts with a seam perpendicular (transverse) to the optical (longitudinal) axis. In addition, various casting methods are known in the art and used for quality optical surfaces. More information about the manufacturing steps is detailed in FIG. 8.

While a conventional elliptical reflector is made from solid optical material such as glass, it is possible that the heat from the mercury arc lamp if not properly controlled can cause the elliptical surface to deform and thus cause a drop in efficiency. Using a metal reflector 33 with an integrated heat removal device such as heat sinks 12 allows the reflector to maintain the elliptical surface over a wide range of operating temperatures such as a 100 deg C. transition. However, in some applications, the choice of reflector material may not be affected by the energy of the lamp, such as in low intensity applications. However, the coatings describe herein can still be applied to the elliptical or other flat or curved surfaces (such a parabolic, hyperbola, hyperbolic, etc.) and still perform a filtering function.

Figure 4:
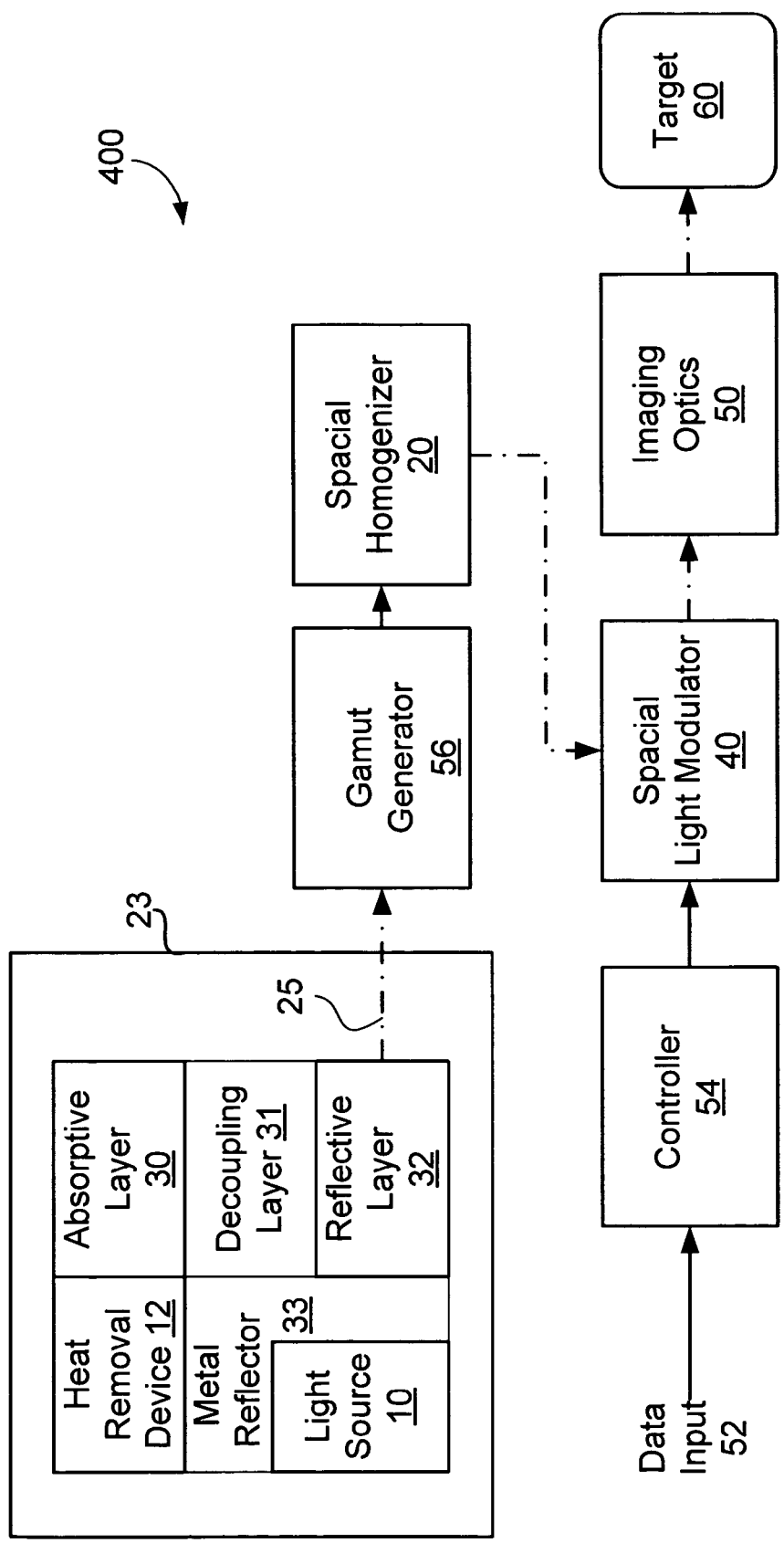
FIG. 4 is an exemplary block diagram of a projection system that includes an embodiment of the invention.

FIG. 4 is a more general block diagram 400 of an embodiment of an optical imaging system that incorporates the invention. The light path through the optical system is illustrated with dot-dash lines. Other signals are shown as solid lines. A light generator 23 includes a light source 10, a metal reflector 33 with an absorptive layer 30, decoupling layer 31 and a reflective layer 32 to create a band-pass filtered light 25 of preferably visible light and transmits it to a gamut generator 56 (for creating color). The light source 10 preferably includes an imaging surface that concentrates the light using a flat or curved surface such a elliptical, parabolic, or compound parabolic, to name a few. The gamut generator 56 for creating color can be optionally incorporated at different points in the light generator or even anywhere in the optical path before the projected light enters the human eye. For instance, the gamut generator 56 can be integrated into the light source 10 or alternatively it may be placed after the light source 10 or the spatial homogenizer 20. It is also possible to incorporate the gamut generator 56 into the spatial light modulator 40 such as with diffractive light devices.

The filtered light 25 from the light generator 23 is optically coupled to the spatial light modulator 40. A controller 54 that receives analog or digital input from a video or picture source data input 52 controls the SLM 40. The light from the SLM 40 is then optically coupled to the imaging optics 50 for projection or imaging on a target 60. Such targets 60 include a front or rear projection screen, a wall, a translucent screen, or other display device, such as an active screen. An active screen allows for optical amplification or contrast enhancement of the image projected on it. In addition, the gamut generator 56 can be incorporated after the spatial light modulator 40, the imaging optics 50 or even incorporated into the target 60, such as with an active screen.

Figure 5:
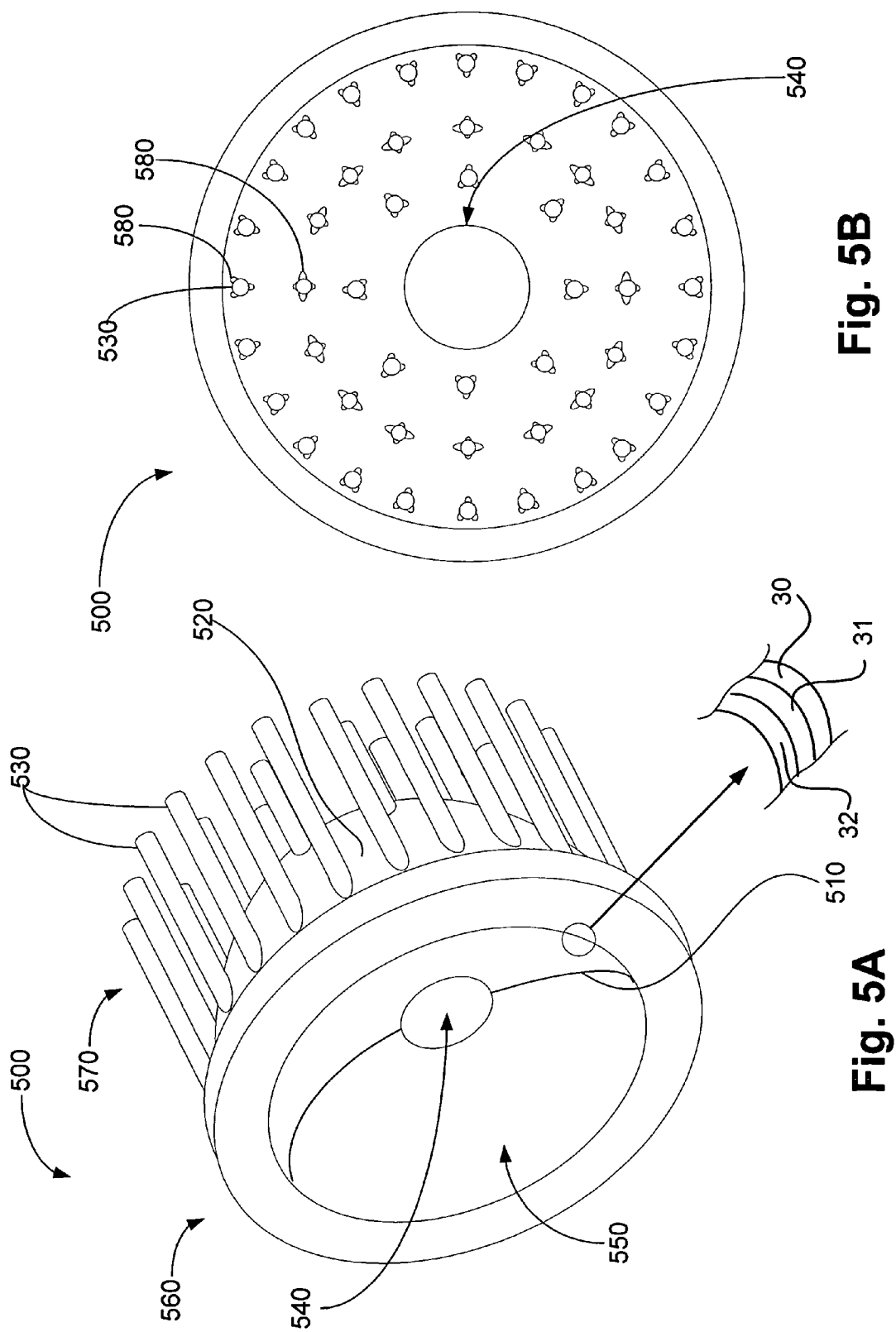
FIGS. 5A-5B are perspective and rear views, respectively, of one exemplary embodiment of a light source that can include an embodiment of the invention.

FIGS. 5A-5B are perspective and rear views respectively of an exemplary embodiment of just one of the possible reflector assemblies 33 that create filtered light. FIG. 5A is an elliptical light source 500 with a bulb opening 540 and a partial elliptical reflector cavity 550. The shape of the partial elliptical reflector 513 is such that light from a first focal point of the ellipse, such as at the location of fireball 17 (FIG. 2), is reflected from reflective surface 510 and forms an image point 14 at the second focal point of the ellipse. The ellipse can be shaped within the reflector body 520 to form the image point closer to the distal end 560 of the mirror at the expense of more optical precision required in the manufacturing of the mirror. Less precision is required if the image point 14 is located further from the distal end 560 of the elliptical mirror, however, the length of the optical path becomes greater. Another benefit of locating the image point 14 further from the elliptical mirror exit is that the cone half-angle of convergence in forming the image point 14 is less than when the image point 14 is formed closer to the exit aperture. This results in not only less distortion of the image point but also helps to couple the image point 14 into the spatial homogenizer 20. The reflective surface 510 is formed by covering the surface of the elliptical reflector cavity 550 with a covering of absorptive layer 30, a covering of germanium used as the decoupling layer 31 and a covering of the reflective layer 32.

FIG. 5B is a rear view of the proximal end 570 of FIG. 5A illustrating the cooling fins 530 that are radially distributed to allow for airflow from an air moving device such as a fan or blower to flow across them and remove heat into the ambient environment. Also shown are turbulence inducing features 580 which are formed on the cooling fins 530 to maximize the turbulence of the airflow as it passes over the cooling fins 530. Maximizing the amount of heat transferred from the reflector body reduces heat build-up in the cavity 550 thereby increasing the life of the lamp assembly as well as allowing the reflector shape to be maintained and efficiently couple light into the spatial homogenizer 20. The opening 540 allows for placement of a fixed or replaceable bulb assembly.

Figure 6:
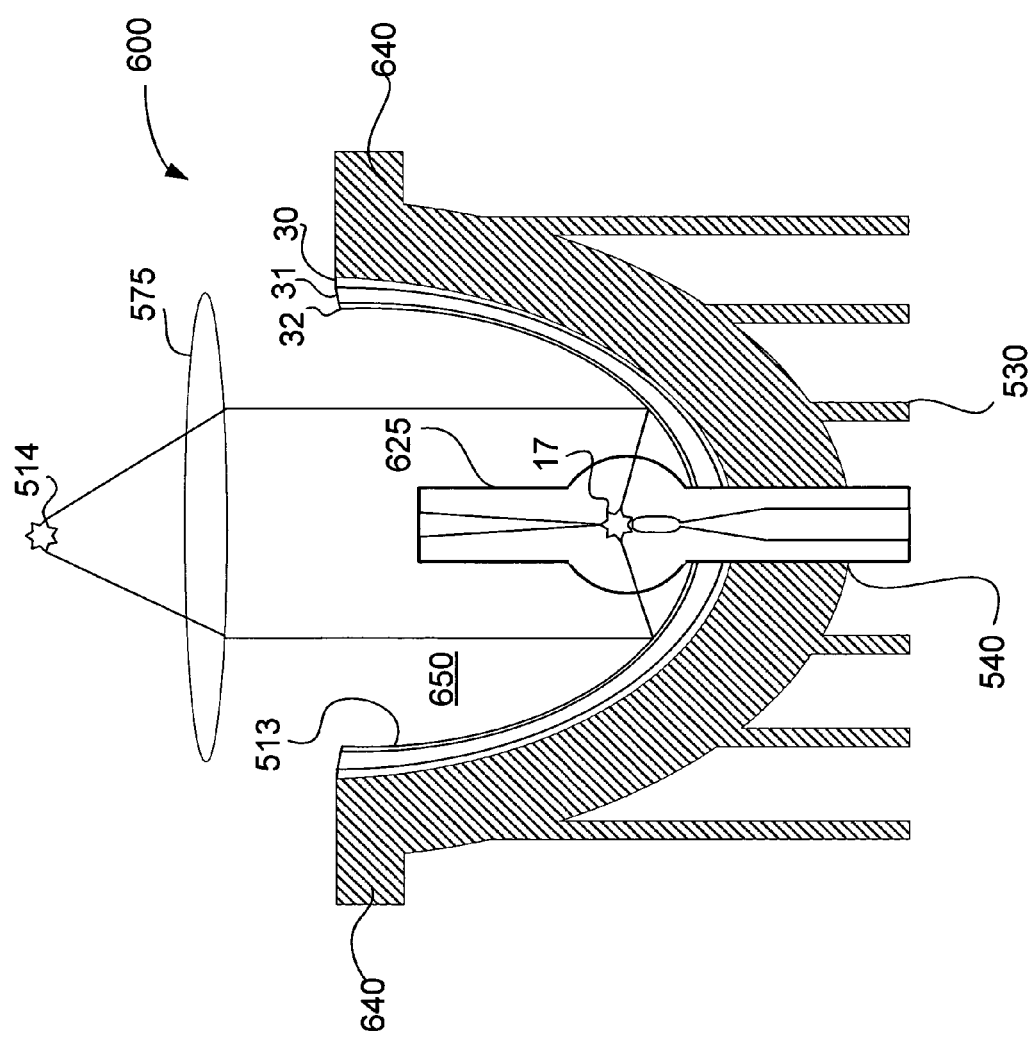
FIG. 6 is an cross-section of an exemplary alternative light source that includes at least one embodiment of the invention.

FIG. 6. is cross-sectional view of an alternative light source 600. In this view, a parabolic light source has a bulb 625 in opening 540 that forms a fireball 17 at a focus of a parabola 513 in cavity 650. The visible light leaving the focus of the parabola is reflected off the reflected surface 32 to create a substantially collimated (parallel) light path that is then imaged to an image point 514 by a condensing lens 575. The UV and IR radiation is transmitted through the visible reflective layer 32 through the decoupling layer 31 of germanium and is absorbed by the absorptive layer 30. The energy absorbed is converted to heat by the absorptive layer and dissipated into the reflective body 640 and ultimately dissipated by the integral cooling fins 530. This approach allows for more flexibility in designing the length of the light path (and hence the half-angle) because the optics of condensing lens 575 forms the image point 514, thus the reflector can be made with less tolerance. This approach is generally less efficient that the elliptical mirror approach and adds an additional element, thus increasing the weight, length, and cost of the light source. However, because the filtered light leaving the reflective surface 32 is substantially only in the visible spectrum a lower cost condensing lens 575 can be used as there is no need for UV and/or IR filtering in the rest of the light path.

One advantage of a band-pass reflector with heat removal to create filtered light is that it can be designed to operate with several different fireball sizes thus allowing for more tolerance in alignment of the imaging light source and interoperability of different light sources. A conventional projector design is generally limited to a single light source having a well-defined fireball imaged to a particular image point. However, a projection or other imaging system using the invention can allow for different types of light sources other than conventional mercury-arc lamps. Mercury is a known toxic material and it is generally desired to reduce or eliminate its use. For instance, light sources such Xenon have longer operating lives and are whiter than mercury bulbs but may not have as much light output for a given wattage and generally do not form as small a point source. Further, there is more light in the IR region which must be removed otherwise it will degrade other optical components in a projector. By incorporating the filter coatings onto a metal reflector with heat removal and imaging the Xenon fireball at an image point in front of the entry aperture of the spatial homogenizer 20, the efficiency of the Xenon light source is improved, thus allowing for a mercury-free light source solution. Thus, the bulb 70 in any of the embodiments may be replaced with a non-mercury light source such as Xenon, Sodium, or Halogen based lights to just name a few. In fact, several different light sources that are non-point sources may be used depending on the application and the spatial light modulators and gamut generators chosen.

Figure 7:
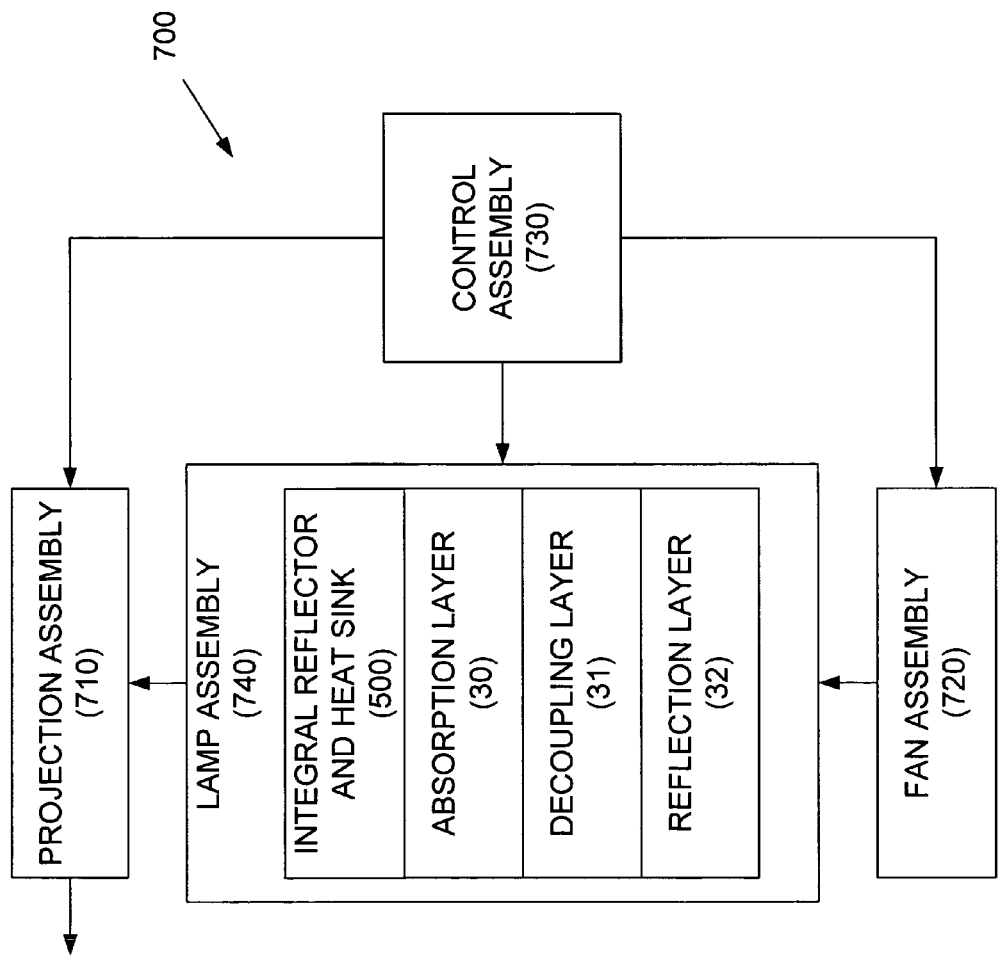
FIG. 7 is an exemplary block diagram of one embodiment of the invention.

FIG. 7 is a block diagram of an embodiment of a projection system 700 that incorporates at least one embodiment of the invention. The projection system 700 has a lamp assembly 740, a fan assembly 720, a projection assembly 710 and a control assembly 730. The control assembly 730 is used to adjust aspects of the projection assembly, to control the power to the lamp assembly 740, and to operate the fan assembly 720. The lamp assembly 740 includes an integral reflector and heat sink that has a plurality of optical coatings applied to the reflector surface. These coatings include an absorption layer 30, a germanium decoupling layer 31 and a reflection layer 32 to create a band-pass filter for creating filtered light in the visible spectrum. Unwanted energy emitted from lamp in the lamp assembly 740 is transmitted through the reflection layer 32, the decoupling layer 31 (if present), and to the absorption layer 30. The heat generated by the absorption layer 30 and the decoupling layer 31 is thermally coupled to the integral heat sink. The controller assembly 730 operates the fan assembly 720 when required to direct an airflow over the heat-sink to remove the unwanted heat into the ambient environment. The filtered light from the lamp assembly 740 is optically coupled to the projection assembly 710. Projection assembly 710 can incorporate one or more spatial light modulators controlled by the control assembly 730 to create viewable images or movies. Alternatively, the projection assembly can controlled for communication functions as well or in addition to creating images.

Figure 8:
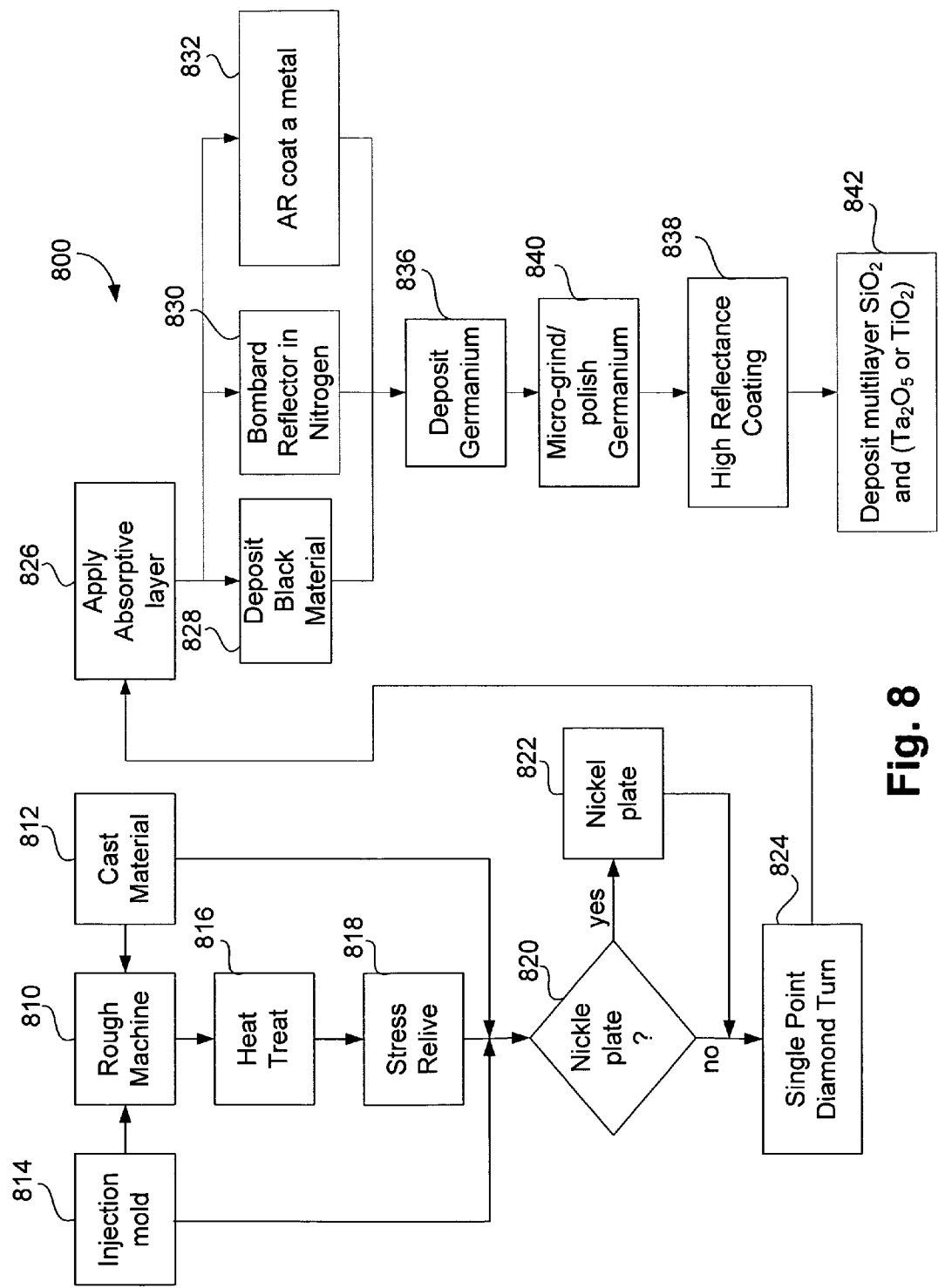
FIG. 8 is a block diagram illustrating exemplary manufacturing steps available to construct embodiments of the invention.

The integral reflector and heat-sink with the band-pass coatings can be created by several different methods. For instance, FIG. 8 is a flow chart representing several different combinations of manufacturing steps 800 possible to create an integrated reflector alone or in combination with other optical elements. An aluminum alloy such as 6061, 7000, or 1000 series can be rough machined (block 810) to near the desired shape and then optionally heat treated (block 816) and/or optionally stress-relieved (block 818) to a known standard such as MIL H 6088. Other formation steps could be to injection mold the aluminum material (step 814) or to use a cast mold to form a cast material (step 812). The molded or cast part can then be further rough machined if the molds are not precise enough. Optionally, one could decide to nickel plate (block 820) the aluminum surface to harden it and if so plate the aluminum with nickel (block 820). Either way, the aluminum alloy part is then optionally single-point diamond turned (SPDT) to create an optical finish (block 824).

After the optical surface has been created, the absorptive layer is applied to the optical surface (step 826). Some of the possible methods include depositing black material (step 828), bombarding the aluminum in nitrogen (step 830), and depositing an anti-reflective coating such as dielectric phase matching layers (step 832). The black material can be chromium black or germanium black directly deposited on the aluminum reflector. The dielectric phase matching layer can be a coating of $MgF_2$ on the aluminum surface with a thin film of chromium thereby creating a broadband black layer. If the aluminum is bombarded in nitrogen, aluminum nitride becomes embedded in the aluminum to create an aluminum black surface that can be directly coated with a high reflectance coating (step 838).

To prevent interaction between the reflective and absorptive layers or to form a polished optical surface that is well characterized, a decoupling layer can be deposited or otherwise applied on the absorptive layer. The decoupling layer is formed from a crystalline germanium that is partially absorptive to the IR radiation to allow it to be thermally and partially optically coupled to the absorptive layer. One exemplary material is to deposit a layer of germanium (step 836) which is may be micro grinded or polished (step 840) to create an optical specular surface. After the decoupling layer is deposited, a high reflectance coating, made of one or more layers, is applied thereon (step 838). One exemplary band-pass reflective surface for visible light is to have multiple layers of $SiO_2$ and one or more layers of tantalum oxide ($Ta_2O_5$), niobium oxide ($NbO_x$), zirconium Oxide ($ZrO_x$), and hafnium oxide ($HfO_x$), or titanium oxide ($TiO_2$) applied (step 842).

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A reflector, comprising:
   a metal reflector defining an optical surface;
   an absorptive surface disposed on the optical surface;
   a layer of germanium disposed on the absorptive surface; and
   a band-pass reflective surface disposed on the layer of germanium.

2. The reflector of claim 1 wherein the band-pass reflective surface reflects light within the visible wavelengths and the absorptive surface absorbs energy outside of the visible wavelengths.

3. The reflector of claim 1, wherein the metal reflector has a coefficient of thermal expansion (CTE) substantially close to the CTE of the layer of germanium.

4. The reflector of claim 1, wherein the metal reflector has a coefficient of thermal expansion (CTE) substantially the same as the CTE of the absorptive surface.

5. The reflector of claim 1 wherein the layer of germanium includes a thickness of about 5 to about 10 microns.

6. The reflector of claim 1 wherein the layer of germanium has been polished or micro-grinded.

7. The reflector of claim 1 wherein the absorptive surface includes one or more metal-dielectric or semimetal-dielectric coatings.

8. The reflector of claim 1 wherein the reflector is an integrating rod.

9. The reflector of claim 8 wherein the dielectric layers includes one or more layers of an oxide selected from the group of $SiO_2$, $Ti_2O_5$, $NbO_x$, $ZrO_x$, $HfO_x$, and $TaO_x$, and combination thereof.

10. The reflector of claim 1 wherein the absorptive surface includes an adhesive function.

11. The reflector of claim 1 wherein the absorptive surface includes microcrystalline materials.

12. The reflector of claim 1 wherein the metal reflector includes a set of cooling fins.

13. The reflector of claim 1 wherein the absorptive surface is chromium black or germanium black.

14. The reflector of claim 1 wherein the absorptive layer is a metal-dielectric or semimetal-dielectric phase matching layer.

15. The reflector of claim 14 wherein the dielectric phase matching layer is MgF2 and a thin film of chromium to create a broadband black layer.

16. The reflector of claim 1 wherein the metal reflector is aluminum and the absorptive layer is selected from the group consisting of aluminum nitrides, yttrium oxides, and aluminum oxides, or combinations thereof.

17. A reflector assembly for a projector, comprising:
   a heat conductive assembly defining an electromagnetic (EM) chamber;
   an absorptive layer disposed on the EM chamber;
   a decoupling layer including germanium disposed on the absorptive layer; and
   a filter disposed on the decoupling layer allowing a first band of frequencies to reflect while allowing other frequencies to pass to the absorptive layer.

18. The reflector assembly of claim 17 wherein the reflector assembly is an integrating rod.

19. A reflector for a projector, comprising:
   a metal assembly defining a shaped surface for concentrating light;

an ultraviolet (UV) and infra-red (IR) filter layer disposed on the shaped surface;
a decoupling layer including germanium disposed on the UV and IR filter layer; and
a reflective surface disposed on the decoupling layer for reflecting light while not reflecting UV and IR.

20. The reflector of claim 19 wherein the reflector is an integrating rod.

21. An optical assembly, comprising:
a light source adapted to create electromagnetic energy;
a fixture for holding the light source and defining an optical surface and thermally coupled to a heat sink;
a layer of germanium disposed on the optical cavity and thermally coupled to the heat sink;
a band-pass filter deposited over the germanium to reflect a range of light frequencies and to transmit electromagnetic energy outside the range of light frequencies to the layer of germanium.

22. The optical assembly of claim 21 wherein the optical assembly includes an integrating rod having the layer of germanium.

23. A method of making an optical reflector with an integral heat-sink, comprising the steps of:
defining a region on the heat-sink to form an optical surface;
covering the surface with material absorptive to at first range of light;
covering the material with a layer of germanium; and
covering the surface over the germanium with a band-pass layer reflective to at least one different range of light.

24. The method of claim 23 wherein the thickness of the layer of germanium is about 5 to about 10 microns.

25. The method of claim 23 further comprising the step of polishing or micro-grinding the layer of germanium.

26. The method of claim 23 wherein the step of covering the band-pass layer comprises the step of applying one or more dielectric layers of $SiO_2$ and at least one layer of oxide from the group consisting of $Ti_2O_5$, $NbO_x$, $ZrO_x$, $HfO_x$, and TaO, and combinations thereof.

27. The method of claim 23 wherein the step of covering the cavity with material includes the step of applying a layer from the group of metal dielectric coatings, semi-metal dielectric coatings, anodized frit glass, microcrystalline materials, chromium black, germanium black, aluminum nitride, and a dielectric phase matching layer, and combinations thereof.

28. The method of claim 23 wherein the step of covering the cavity with material includes the step of applying a nickel coating.

29. The method of claim 23 wherein the step of covering the cavity with material includes the steps of applying coatings of $MgF_2$ and chromium to create a broadband black layer.

30. The method of claim 23 further including the step of bombarding the heatsink with nitrogen.

31. The method of claim 23 wherein the optical reflector is an integrating rod.

32. A method of creating a filtered light source for an optical projector, comprising:
creating a wide-band light source spanning from the infrared (IR) to the ultraviolet (UV);
filtering the IR and UV light from the wide-band light source with dielectric coatings to create a white light output and a thermal radiant output; and
transferring the thermal radiant output via a layer of germanium to a heat-sink forming an optical device that the dielectric coatings are disposed on, the optical device projecting the white light output.

33. The method of claim 32 wherein the step of filtering the IR and UV light from the wide-band light source with dielectric coatings to create a white light output and a thermal radiant output is partially performed on an integrating rod.

34. A reflector, comprising:
a metal reflector;
an absorptive coating on the metal reflector;
a decoupling germanium layer on the absorptive coating; and
a selective optical reflector disposed on the decoupling germanium layer that allows at least one of UV and IR to pass through to the absorptive coating.

35. The reflector of claim 34 further comprising an integral heat removal device thermally coupled to the absorptive coating.

36. The reflector of claim 34 wherein the reflector is an integrating rod.

* * * * *

UNITED STATES PATENT AND TRADEMARK OFFICE
CERTIFICATE OF CORRECTION

| | | |
|---|---|---|
| PATENT NO. | : 7,742,225 B2 | Page 1 of 1 |
| APPLICATION NO. | : 11/176028 | |
| DATED | : June 22, 2010 | |
| INVENTOR(S) | : Wu et al. | |

It is certified that error appears in the above-identified patent and that said Letters Patent is hereby corrected as shown below:

In column 12, line 48, in Claim 15, delete "MgF2" and insert -- $MgF_2$ --, therefor.

Signed and Sealed this
Eighteenth Day of January, 2011

David J. Kappos
*Director of the United States Patent and Trademark Office*